(12) United States Patent  
Rajkondawar et al.

(10) Patent No.: US 7,798,104 B2
(45) Date of Patent: Sep. 21, 2010

(54) LIVESTOCK FOOTBATH SYSTEM

(75) Inventors: Parimal G. Rajkondawar, Madison, WI (US); William S. Nelson, Sun Prairie, WI (US); Alexander P. Kobryn, Cottage Grove, WI (US); Shawn R. Eckhardt, Sun Prairie, WI (US)

(73) Assignee: Technologies Holdings Corp., Houston, TX (US)

( * ) Notice: Subject to any disclaimer, the term of this patent is extended or adjusted under 35 U.S.C. 154(b) by 989 days.

(21) Appl. No.: 11/528,290

(22) Filed: Sep. 27, 2006

(65) Prior Publication Data

US 2008/0072840 A1 Mar. 27, 2008

(51) Int. Cl.
*A01K 29/00* (2006.01)
(52) U.S. Cl. ..................................... 119/651
(58) Field of Classification Search .............. 119/651
See application file for complete search history.

(56) References Cited

U.S. PATENT DOCUMENTS

| | | | |
|---|---|---|---|
| 488,778 A | 12/1892 | Smiley | |
| 625,474 A | 5/1899 | Skinner | |
| 853,533 A * | 5/1907 | Byrd | ............... 119/673 |
| 858,533 A | 5/1907 | Byrd | |
| 983,820 A | 2/1911 | Goff | |
| 1,273,311 A | 7/1918 | Barnes | |
| 2,684,658 A | 7/1954 | Richardson et al. | |
| 2,956,565 A * | 10/1960 | Anderson | ............... 607/86 |
| 2,989,965 A | 6/1961 | Rod | |
| 3,108,574 A | 10/1963 | Albers | |
| 3,554,166 A | 1/1971 | Belden | |
| 3,643,586 A * | 2/1972 | Robinson | ............... 53/510 |
| 3,763,828 A | 10/1973 | Tighe | |
| 3,792,686 A | 2/1974 | Needham et al. | |
| 3,884,191 A | 5/1975 | Stout | |
| 3,884,192 A | 5/1975 | Knapp | |
| 4,020,865 A * | 5/1977 | Moffat et al. | ............... 137/268 |
| 4,086,669 A | 5/1978 | Combis | |
| 4,126,104 A | 11/1978 | Overby | |
| 4,183,329 A * | 1/1980 | Leonaggeo, Jr. | ............ 119/651 |
| 4,197,815 A | 4/1980 | Brazelton | |
| 4,291,646 A * | 9/1981 | Leonaggeo, Jr. | ............ 119/702 |
| 4,316,433 A * | 2/1982 | Hebert | ............... 119/673 |
| 4,317,431 A * | 3/1982 | Sparkes | ............... 119/651 |
| 4,334,504 A | 6/1982 | Matthews | |
| 4,342,285 A | 8/1982 | James | |
| 4,381,996 A | 5/1983 | Kugler et al. | |
| 4,485,503 A | 12/1984 | Rolando et al. | |
| 4,549,502 A | 10/1985 | Namdari | |
| 4,580,529 A * | 4/1986 | Wilson | ............... 119/651 |
| 4,593,645 A | 6/1986 | Dingler | |
| 4,987,861 A | 1/1991 | Lemire et al. | |

(Continued)

FOREIGN PATENT DOCUMENTS

EP 0 648 410 4/1995

(Continued)

*Primary Examiner*—Timothy D Collins
*Assistant Examiner*—Justin Benedik
(74) *Attorney, Agent, or Firm*—Andrus, Sceales, Starke & Sawall, LLP (57) ABSTRACT

A footbath system for livestock includes a water and/or chemical containment tank, a footbath pan with a drainage exit door, non-turbulent flow, and a multiple branch system.

48 Claims, 5 Drawing Sheets

U.S. PATENT DOCUMENTS

| | | |
|---|---|---|
| 5,063,880 A | 11/1991 | Bouthillier |
| 5,195,455 A | 3/1993 | van der Lely et al. |
| 5,213,064 A | 5/1993 | Mondine et al. |
| 5,224,224 A | 7/1993 | Hintz et al. |
| 5,289,599 A | 3/1994 | Hintz et al. |
| 5,383,423 A | 1/1995 | van der Lely |
| 5,439,020 A * | 8/1995 | Lockhart ............... 137/3 |
| 5,448,966 A | 9/1995 | McKinnon et al. |
| 5,474,102 A * | 12/1995 | Lopez ............... 137/271 |
| 5,588,161 A | 12/1996 | Barradas |
| 5,630,379 A * | 5/1997 | Gerk et al. ............ 119/667 |
| 5,724,918 A | 3/1998 | Navalon-Chicote |
| 5,774,909 A * | 7/1998 | Stable ............... 4/622 |
| 5,842,442 A | 12/1998 | Marr |
| 6,029,610 A * | 2/2000 | Ramsey et al. ......... 119/651 |
| 6,095,430 A | 8/2000 | Bailey |
| 6,382,136 B1 | 5/2002 | Bragulla et al. |
| 6,463,885 B1 * | 10/2002 | Laner ............... 119/652 |
| 6,739,286 B2 * | 5/2004 | Vander Veen ......... 119/673 |
| 2004/0216692 A1 * | 11/2004 | Vander Veen ......... 119/673 |

FOREIGN PATENT DOCUMENTS

| | | |
|---|---|---|
| FR | 2609361 | 7/1988 |
| GB | 1 388 676 | 3/1975 |
| JP | 2000-041513 | 2/2000 |
| JP | 2001-017016 | 1/2001 |
| NL | 1 017 154 | 7/2002 |
| SU | 816470 | 3/1981 |
| WO | WO-93/08764 | 5/1993 |
| WO | WO-96/13971 | 5/1996 |
| WO | WO-97/43898 | 11/1997 |
| WO | WO-99/04623 | 2/1999 |
| WO | WO-01/41560 | 6/2001 |
| WO | WO-03/056918 | 7/2003 |
| WO | WO-2007/070655 | 6/2007 |

* cited by examiner

FIG. 7 ially elongated along a longitudinal axis 70, FIGS. 4, 6. The noted
LIVESTOCK FOOTBATH SYSTEM

BACKGROUND AND SUMMARY

The invention relates to footbath systems for livestock, including methods for treating hooves of livestock.

The invention arose during continuing development efforts directed toward treatment of the hooves of dairy animals as they enter and/or exit a milking parlor. The invention provides improvements in such systems, and is applicable to various livestock, including dairy animals, including cows, goats, sheep, buffalo, and to other livestock including horses and cattle.

DETAILED DESCRIPTION

Figures 1, 5, 8:
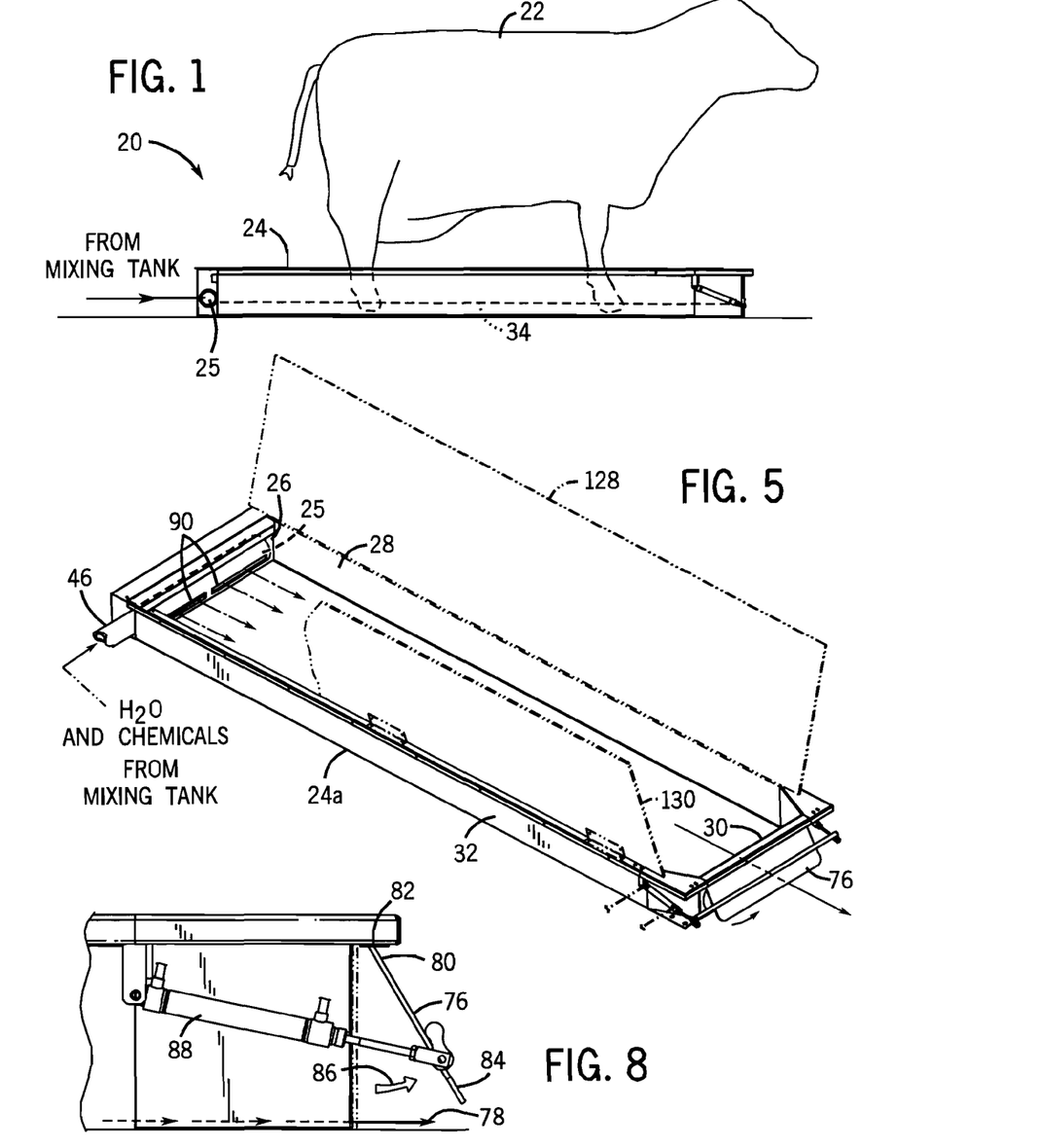
FIG. 1 is a side elevation view of a livestock footbath system in accordance with the invention.
FIG. 5 is like FIG. 4 and shows a further embodiment.
FIG. 8 is an enlarged view of a portion of FIG. 7.
Figure 2:
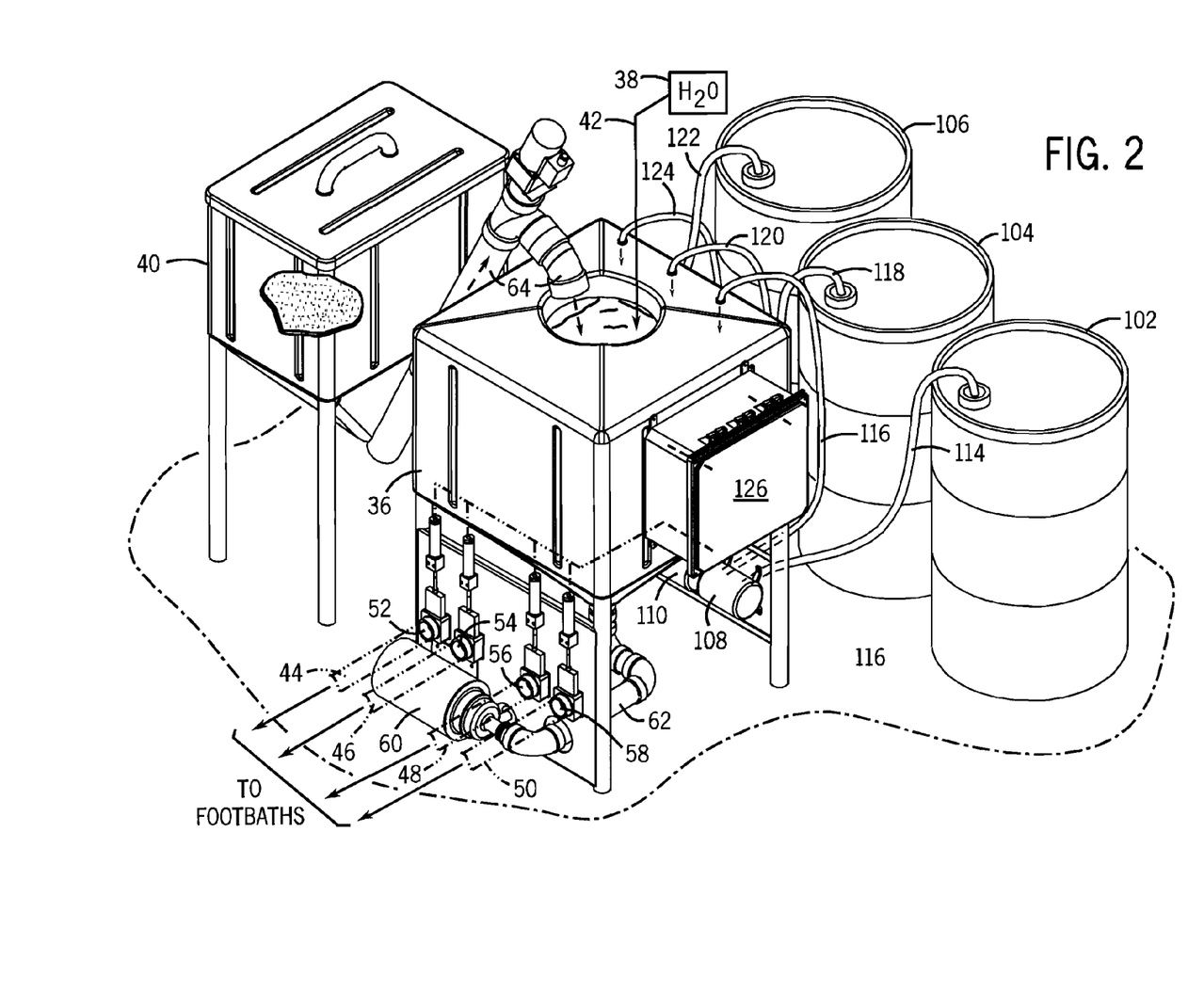
FIG. 2 is a perspective view of a water and chemical supply system for the footbath of FIG. 1.
Figure 3:
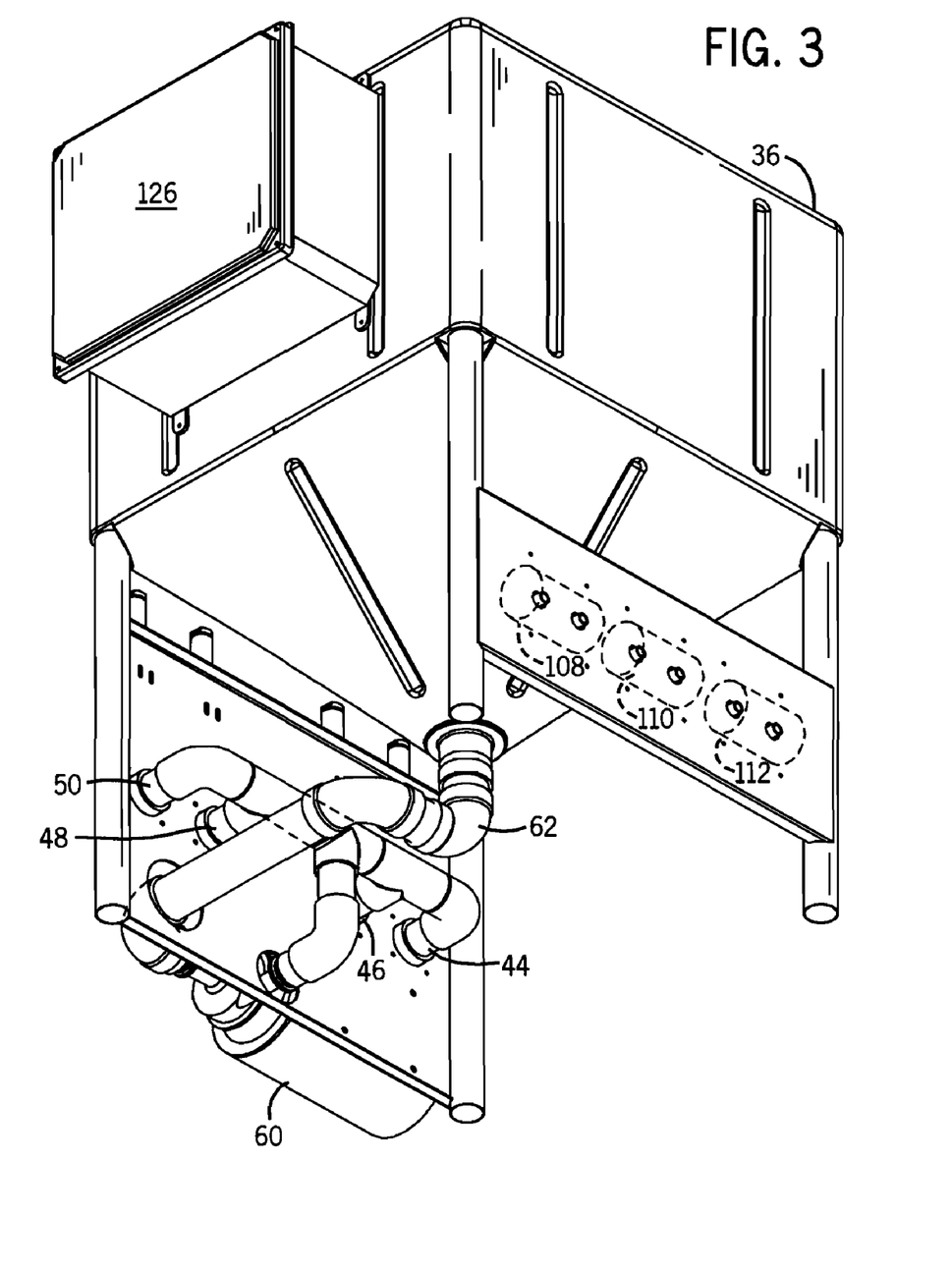
FIG. 3 is a perspective view from a different angle of a portion of FIG. 2.

FIG. 1 shows a footbath system 20 for livestock, including dairy animals such as 22. A footbath pan 24 is provided for livestock to walk through. The pan has an inlet manifold 25, FIGS. 1, 4, for receiving footbath liquid, and walls 26, 28, 30, 32 containing the footbath liquid therein, for example as shown at 34. A combined water containing and chemical mixing tank 36, FIGS. 2, 3, is separate from pan 24. Tank 36 receives water from a water source 38, and receives one or more chemicals from one or more chemical sources such as 40 for mixing in tank 36 to provide a pre-mixed footbath liquid. Tank 36 supplies the pre-mixed footbath liquid to pan 24, to be described.

Figure 4:
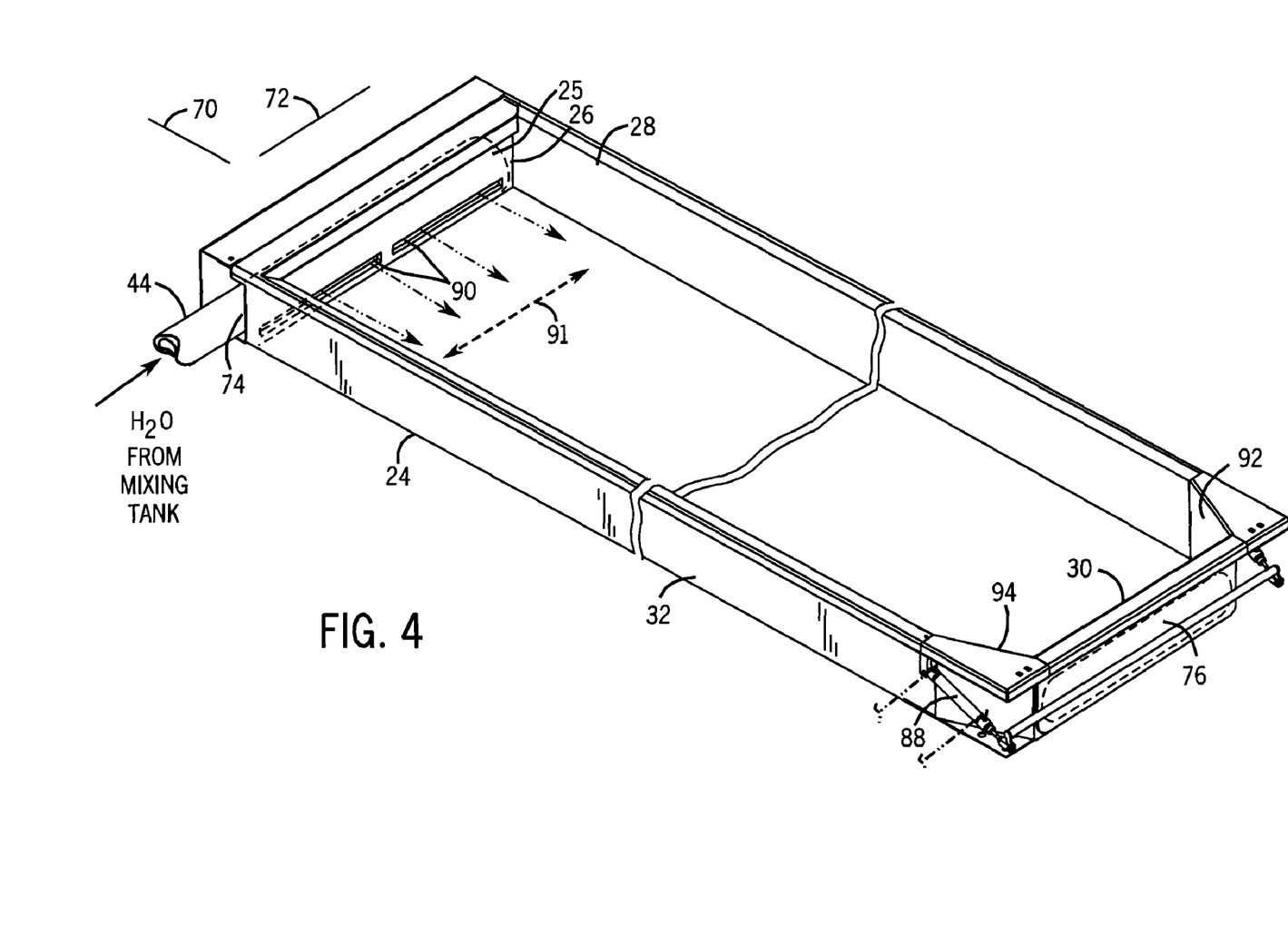
FIG. 4 is a perspective view of the footbath of FIG. 1.

Tank 36, FIG. 2, has an inlet conduit 42 receiving water from water source 38. Tank 36 has one or more outlet conduits 44, 46, 48, 50 supplying the pre-mixed footbath liquid to respective footbath pans such as 24. Tank 36 is disposed in serial fluid flow communication between inlet conduit 42 and outlet conduits 44-50, such that water flows from upstream to downstream from inlet conduit 42 into tank 36 and then from tank 36 to outlet conduits 44-50. Tank 36 isolates outlet conduits 44-50 from inlet conduit 42 such that liquid pressure in outlet conduits 44-50 supplying pre-mixed footbath liquid to a respective pan such as 24, e.g. at conduit 44, FIG. 4, is isolated from water pressure in inlet conduit 42 supplying water from water source 38. Each of the outlet conduits 44-50 has a respective valve 52, 54, 56, 58, each having an on-state permitting liquid flow from tank 36 through the respective outlet conduit to the respective pan such as 24, and having an off-state blocking liquid flow from tank 36 through the respective outlet conduit to the respective pan. A pump 60, FIGS. 2, 3, pumps liquid from tank 36 via drain outlet conduit 62 then through outlet conduits 44-50 to a respective pan such as 24 at a pressure independent of water pressure from water source 38. Valves 52-58 are provided in respective outlet conduits 44-50 downstream of pump 60.

Tank 36 has a chemical inlet conduit 64, FIG. 2. Chemical source 40 is a chemical container storing one or more chemicals and supplying the one or more chemicals through chemical conduit 64 to tank 36. In one embodiment, container 40 is a hopper storing one or more powder chemicals, and chemical conduit 64 includes an auger transporting the powder chemicals to tank 36. Powder chemicals may be desirable in various applications for the convenience of the dairy farmer enabling him to merely dump the powder into hopper 40 for storage and subsequent usage. The chemicals typically include, but are not limited to, germicides, bacteriacides, other medical treatments, and so on, to treat the hooves of livestock.

Tank 36 has the noted outlet conduits 62, 44-50, FIGS. 2, 3, supplying the pre-mixed footbath liquid to one or more footbath pans such as 24, FIG. 4, 24a, FIG. 5, etc. The outlet conduit includes an upstream segment 62 receiving the pre-mixed footbath liquid from tank 36, and a plurality of parallel downstream segments 44-50 receiving the pre-mixed footbath liquid in parallel from upstream segment 62 and supplying the pre-mixed footbath liquid to respective pans such as 24, 24a, and so on. Valves 52-58 are provided in respective downstream segments 44-50 of the outlet conduit.

Figure 6:
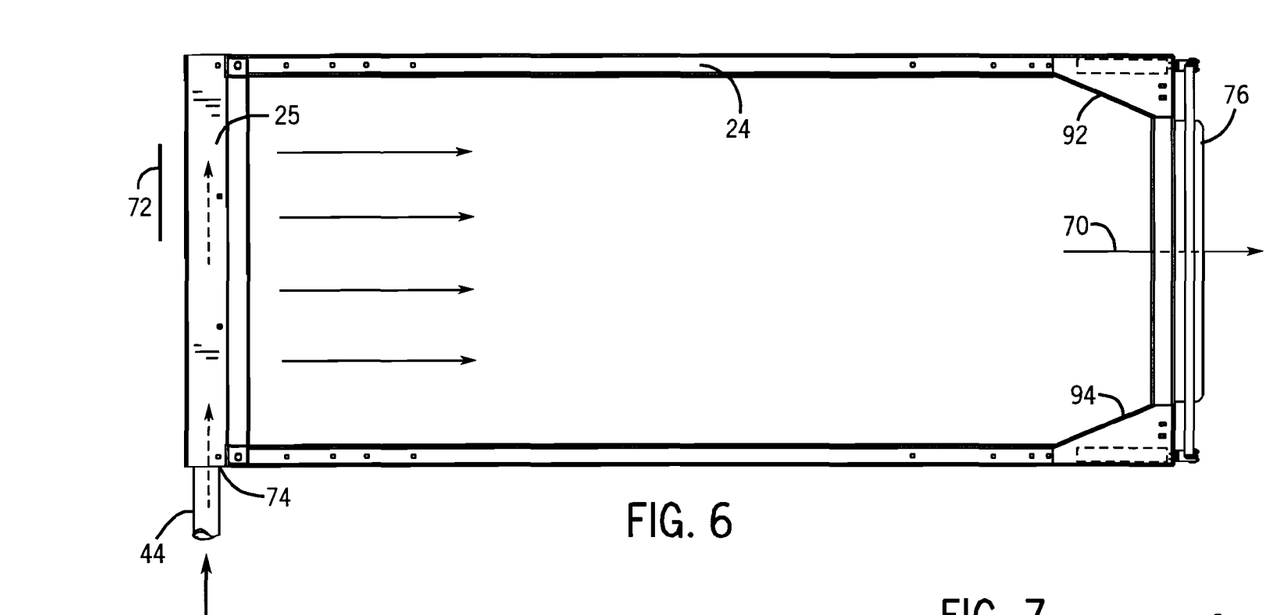
FIG. 6 is a top elevation view of the footbath of FIG. 4.

In the preferred embodiment, footbath pan 24 is axially elongated along a longitudinal axis 70, FIGS. 4, 6. The noted walls include upstream and downstream end walls 26 and 30, and a pair of sidewalls 28 and 32 extending axially longitudinally therebetween. End walls 26, 30 and sidewalls 28, 32 have a height sufficient to contain footbath liquid around the livestock's hooves. The livestock initially steps into the pan over upstream end wall 26 and then walks axially (rightwardly in FIGS. 1, 4, 6, 7) while between sidewalls 28, 32 and then exits the pan by stepping over downstream end wall 30. Each of end walls 26 and 30 has a respective length extending laterally along lateral direction 72 between sidewalls 28 and 32. Each of sidewalls 28, 32 has a respective length extending longitudinally along longitudinal axial direction 70 between end walls 26 and 30. The above noted outlet conduit 44 from tank 36 is connected to a pan inlet 74 supplying liquid into pan 24 at manifold 25.

Figure 7:
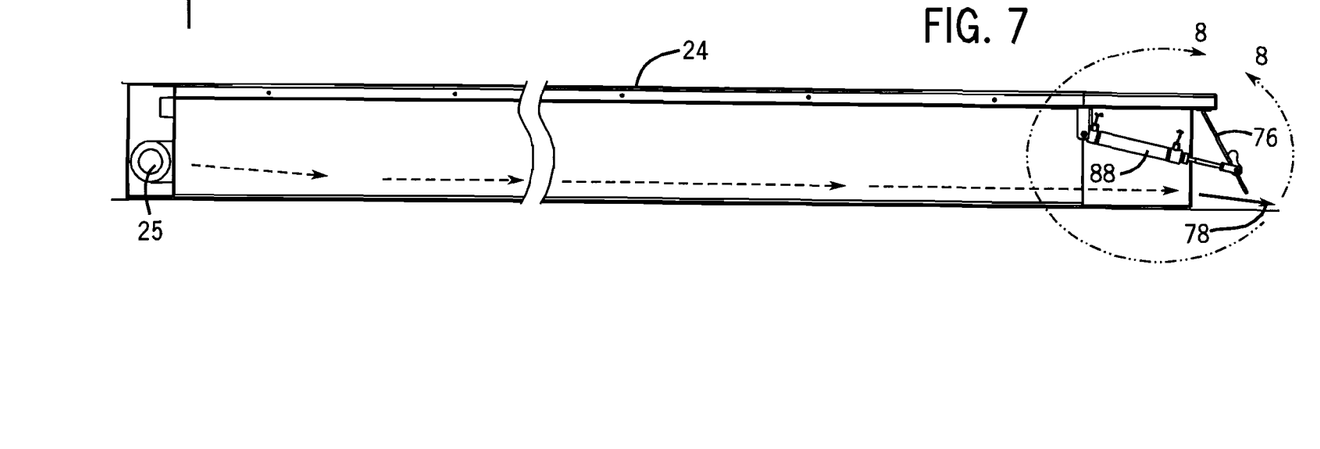
FIG. 7 is a side elevation view of the footbath of FIG. 4.

A door 76, FIGS. 4-8, has a closed position, FIG. 4, retaining liquid in pan 24, and has an open position, FIGS. 5, 7, 8, draining liquid from the pan, as shown at arrow 78. The door forms at least a portion of, and preferably most or all of, a designated one of the noted walls 26-32, preferably downstream end wall 30. Door 76 preferably has a length of at least 50% of the length of the noted designated wall, e.g. downstream end wall 30, for reasons noted below. Door 76 has an upper edge 80 pivoted on a hinge 82 about an upper pivot axis, and has a lower edge 84 swingable in an arc 86 about the noted upper pivot axis between the closed position and the open position. Door 76 is preferably at the downstream end wall and extends laterally along lateral direction 72 substantially the entire lateral length of downstream end wall 30, which in the preferred embodiment enhances desired flow, noted below. Door 76 is actuated between the closed and open positions by pneumatic cylinder 88.

Pan inlet 74, FIG. 4, preferably supplies liquid in non-turbulent flow into and along pan 24 via inlet manifold 25. Inlet manifold 25 has one or more flow ports 90, FIG. 4, provided by one or more slots or openings or the like, along a given lateral span 91 and preferably discharging liquid at high volume, low velocity flow, namely selected to provide a Reynolds number less than 600,000, to provide non-turbulence. In a further preferred embodiment, the flow is selected to provide a Reynolds number between 300,000 and 600,000, to provide non-turbulent transitional flow. In a yet further preferred embodiment, the flow is selected to provide a Reynolds number less than 300,000, to provide non-turbulent laminar sheet flow. Door 76 is distally opposite flow ports 90 and preferably has a length at least as great as the noted lateral span 91 thereof. In the preferred embodiment, the noted non-turbulent flow is along a rectilinear flow path from the inlet at flow ports 90 to the outlet at door 76 without eddy currents, and further preferably in the noted laminar sheet flow. At the downstream end, if the lateral length of door 76 is not as great as the lateral length of downstream end wall 30, then it is preferred that tapered ramp surfaces be provided as shown at 92, 94, to guide the noted flow in non-turbulent manner, and without eddy currents, to door 76.

The present system provides a method for treating hooves of livestock, including dairy animals. The method includes the steps of providing a footbath system including a footbath pan 24 for livestock to walk through, the pan having walls 26-32 containing footbath liquid therein, providing a combined water containing and chemical mixing tank 36 separate from pan 24, supplying water from a water source to the tank, supplying one or more chemicals from a chemical source 40 to the tank, mixing the water and the one or more chemicals in the tank to provide a pre-mixed footbath liquid, and supplying the pre-mixed footbath liquid from the tank to the pan. The method includes providing the tank with an inlet conduit 42 receiving water from the water source 38, providing the tank with an outlet conduit 62, 44-50, supplying the pre-mixed footbath liquid to one or more pans 24, 24a, etc., disposing the tank 36 in serial fluid flow communication between inlet conduit 42 and outlet conduit 62, 44-50, supplying water to flow from upstream to downstream from inlet conduit 42 into tank 36 and then from tank 36 to outlet conduit 62, 44-50, isolating outlet conduit 62, 44-50 from inlet conduit 42 by tank 36 therebetween such that liquid pressure in outlet conduit 62, 44-50 supplying the pre-mixed footbath liquid to pans 24, 24a, etc., is isolated from water pressure in inlet conduit 42 from water source 38. The method further includes providing tank 36 with a chemical inlet conduit 64, providing the chemical source 40 as a chemical container storing one or more chemicals, and supplying the one or more chemicals from the container 40 through the chemical conduit 64 to tank 36. The method further includes providing the container 40 as a hopper, storing one or more powder chemicals in the hopper, providing the chemical conduit 64 as an auger, and transporting powder chemicals with the auger to tank 36. The method further includes providing the pan with a door 76 having a closed position retaining liquid in the pan, and having an open position draining liquid from the pan, providing the pan with an inlet 74 including inlet manifold 25, and supplying liquid from the inlet manifold 25 at flow ports 90 in non-turbulent flow into and along pan 24. The method includes supplying the liquid in non-turbulent flow into and along pan 24 in each of the noted closed and open positions of door 76.

In one embodiment, the system has a drain mode, a flush mode, and a fill mode. In the drain mode, the method preferably includes opening door 76 without liquid flow into pan 24 at inlet 74. In the flush mode, the method preferably includes opening door 76 and supplying liquid in non-turbulent flow from the inlet at flow ports 90 into and along pan 24. In the fill mode, the method preferably includes closing door 76 and supplying the liquid at inlet 74 in non-turbulent flow into and along pan 24. In the fill mode, the method further preferably includes additionally supplying one or more chemicals into pan 24 through the same inlet 74 and same manifold 25 and same flow ports 90 supplying water into the pan in non-turbulent flow.

The present system desirably eliminates high velocity jet nozzle flow into the pan, and consequent turbulence and eddy currents. Prior art systems typically include an agitation phase prior to the drain phase, wherein high velocity turbulent and eddy current flow is used for agitation, followed by draining and flushing. The present system desirably eliminates turbulent agitation and eddy current flow because of undesirable splatter and jet spray, and undesirable release of bacteria and odor upon break-up and/or dissolution of manure and the like. Laterally elongated door 76 is desired over prior smaller discharge orifices because door 76 facilitates easy drainage without agitation and turbulence. The high volume, low velocity inlet flow at ports 90 at Reynolds number less than 600,000, and preferably less than 300,000 to provide laminar sheet flow, is further desired because it enables the noted chemicals to be introduced through the same inlet flow ports 90 as the water, without requiring a second separate set of one or more chemical inlets as in the prior art using a first set of high velocity jet nozzle ports for water inlet, and a second set of ports for chemical inlet.

In another embodiment, one or more liquid chemical containers 102, 104, 106, FIG. 2, may be used instead of, or in addition to, powder chemical container 40. The liquid chemicals are pumped by respective pumps 108, 110, 112 through respective conduits 114 and 116, 118 and 120, 122 and 124, from respective storage tank containers 102, 104, 106 to mixing tank 36. The footbath liquid may include water plus one or more chemicals, or water only, or one or more chemicals only. The system may be manually controlled, or in another embodiment may be automated including a control panel 126 or the like responsive to livestock count, sensed chemical conditions in the footbaths, timing patterns, including time of day or week, and so on. In a further embodiment, one or more of the footbaths may have folding hatch doors such as 128, 130, FIG. 5, for closing and covering the footbath when not in use. In further embodiments, auger 64 may instead be a conveyor or some other transport mechanism transporting chemicals therealong to tank 36. In further embodiments, the various chemical inlets may be unused or not connected, e.g. for a water-only flush, fill, etc., wherein tank 36 only contains water, which water is the sole constituent of the footbath liquid.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A footbath system for livestock, having a footbath pan for livestock to walk through, said pan containing footbath liquid therein, wherein said pan comprises upstream and downstream end walls and a pair of sidewalls extending axially therebetween, said end walls and said sidewalls having a height sufficient to contain footbath liquid around the livestock's hooves, the livestock initially stepping into said pan over said upstream end wall and then walking axially while between said sidewalls and then exiting said pan by stepping over said downstream end wall, each of said end walls having a respective length extending laterally between said sidewalls, each of said sidewalls having a respective length extending axially between said end walls, said pan being axially elongated along a longitudinal axis, said sidewalls extending axially longitudinally between said end walls, a tank provided separate from said pan, said tank receiving water from a water source for containment in said tank to provide said footbath liquid, said tank having an outlet conduit supplying said footbath liquid to said pan, said tank is a combined water containing and chemical mixing tank separate from said pan, said tank receiving water from said water source and receiving one or more chemicals from a chemical source for mixing in said tank to provide a pre-mixed footbath liquid, said tank supplying said pre-mixed footbath liquid to said pan, said tank is disposed in serial fluid communication between said water source and said outlet conduit such that water flows from upstream to downstream from said water source into said tank and then from said tank to said outlet conduit, said tank isolates said outlet conduit from said water source such that liquid pressure in said outlet conduit supplying said pre-mixed footbath liquid to said pan is isolated from water pressure from said water source supplying water to said pan, said tank preventing chemicals from entering said water source, said tank providing said pre-mixed footbath liquid to said pan at a rate independent of said water source, via an inlet to said pan at said upstream end wall, wherein said inlet has one or more flow ports, said flow ports comprising one or more laterally elongated slots laterally spaced from each other, the one or more flow ports discharging liquid at sufficiently high volume and sufficiently low velocity flow to provide non-turbulence, to flush manure without turbulent agitation and eddy current flow otherwise causing splatter and release of bacteria and odor upon break-up of the manure.

2. The footbath system according to claim 1 wherein said pre-mixed footbath liquid is supplied to said pan by a pump.

3. The footbath system according to claim 1 wherein said pre-mixed footbath liquid is supplied to said pan by gravity flow.

4. The footbath system according to claim 1 wherein said pan comprises a door having a closed position retaining said pre-mixed footbath liquid in said pan, and an open position draining said pre-mixed footbath liquid from said pan, and wherein said pre-mixed footbath liquid flows from said tank into and along said pan in each of said closed and open positions of said door.

5. The footbath system according to claim 1 comprising a valve having an on state permitting liquid flow from said tank to said pan, and having an off state blocking said liquid flow from said tank to said pan.

6. The footbath system according to claim 1 comprising a pump pumping liquid from said tank to said pan at a pressure independent of water pressure from said water source.

7. The footbath system according to claim 1 comprising a pump pumping liquid from said tank to said pan, and a valve having an on state permitting liquid flow to said pan and having an off state blocking liquid flow to said pan.

8. The footbath system according to claim 1 comprising a chemical container storing one or more chemicals, said chemical container supplying said one or more chemicals to said tank.

9. The footbath system according to claim 8 wherein said chemical container is a hopper storing one or more powder chemicals, and wherein said tank has a chemical inlet conduit transporting said powdered chemicals from said hopper to said tank.

10. The footbath system according to claim 1 wherein said tank has a first inlet conduit receiving water from said water source, a second inlet conduit receiving one or more chemicals from said chemical source, and said outlet conduit supplying said pre-mixed footbath liquid to said pan.

11. The footbath system according to claim 1 wherein said pan comprises a door having a closed position retaining said pre-mixed footbath liquid in said pan, and an open position draining said pre-mixed footbath liquid from said pan, said door is at said downstream end wall, said door has an edge pivoted on a hinge about a pivot axis, and an opposite edge swingable in an arc about said pivot axis between said closed position and said open position.

12. The footbath system according to claim 11 wherein said edge is an upper edge, and said door is pivoted about said upper edge on said hinge about an upper pivot axis, and wherein said opposite edge is a lower edge swingable in an arc about said upper pivot axis between said closed position and said open position.

13. The footbath system according to claim 1 wherein said pan comprises a door having a closed position retaining said pre-mixed footbath liquid in said pan, and an open position draining said pre-mixed footbath liquid from said pan, said door is at said downstream end wall and extends along substantially the entire length of said downstream end wall.

14. The footbath system according to claim 1 wherein said pan comprises a door having a closed position retaining said pre-mixed footbath liquid in said pan, and an open position draining said pre-mixed footbath liquid from said pan, said door is at said downstream end wall, and the lateral length of said door is less than the lateral length of said downstream end wall, and comprising tapered ramp surfaces between respective said sidewalls and said downstream end wall and guiding flow therealong.

15. The footbath system according to claim 1 wherein said pan comprises an inlet receiving water from said tank, said pan inlet comprises an inlet manifold having one or more flow ports along a given span, said pan comprises a door having a closed position retaining said pre-mixed footbath liquid in said pan, and an open position draining said pre-mixed footbath liquid from said pan, and said door is distally opposite said flow ports of said manifold and has a length at least as great as said span.

16. The footbath system according to claim 1 wherein said tank supplies said pre-mixed footbath liquid in non-turbulent flow into and along said pan along a rectilinear flow path through said pan.

17. The footbath system according to claim 16 wherein said pan has a pan inlet receiving said pre-mixed liquid from said tank, said pan inlet comprising an inlet manifold having one or more flow ports, said pan comprises a door having a closed position retaining said pre-mixed footbath liquid in said pan, and an open position draining said pre-mixed footbath liquid from said pan, said non-turbulent flow is along a rectilinear flow path from said flow ports to said door without eddy currents.

18. The footbath system according to claim 1 wherein said tank supplies said pre-mixed footbath liquid in non-turbulent and laminar flow into and along said pan.

19. The footbath system according to claim 1 wherein said tank supplies said pre-mixed footbath liquid in non-turbulent and transitional flow into and along said pan.

20. The footbath system according to claim 1 wherein said outlet conduit comprises an upstream segment receiving said pre-mixed footbath liquid from said tank, and a plurality of parallel downstream segments receiving said pre-mixed footbath liquid in parallel from said upstream segment and supplying said pre-mixed footbath liquid to a plurality of respective said pans, a plurality of valves each in a respective one of said downstream segments and having an on state permitting liquid flow from said tank through said upstream segment then through the respective downstream segment to the respective said pan, and having an off state blocking said liquid flow.

21. The footbath system according to claim 20 wherein said tank comprises a combined water containing and chemical mixing tank separate from said pans, said tank receiving one or more chemicals from one or more chemical sources for mixing in said tank to provide said pre-mixed footbath liquid, said outlet conduit supplying said pre-mixed footbath liquid to said pans.

22. A footbath system for livestock, having a footbath pan for livestock to walk through, said pan containing footbath liquid therein, said pan comprising upstream and downstream end walls and a pair of sidewalls extending axially therebetween, said end walls and said sidewalls having a height sufficient to contain footbath liquid around the livestock's hooves, the livestock initially stepping into said pan over said upstream end wall and then walking axially while between said sidewalls and then exiting said pan by stepping over said downstream end wall, each of said end walls having a respective length extending laterally between said sidewalls, each of said sidewalls having a respective length extending axially between said end walls, said pan being axially elongated along a longitudinal axis, said sidewalls extending axially longitudinally between said end walls, comprising:

an inlet to said pan at said upstream end wall comprising a manifold supplying said liquid into said pan;

a tank provided separate from said pan, said tank receiving water from a water source for containment in said tank to provide said footbath liquid, said tank having an outlet conduit supplying said footbath liquid to said pan, said outlet conduit being connected to said pan inlet;

said tank is a combined water containing and chemical mixing tank separate from said pan, said tank receiving water from said water source and receiving one or more chemicals from a chemical source for mixing in said tank to provide a pre-mixed footbath liquid, said tank supplying said pre-mixed footbath liquid to said pan, said tank has an inlet conduit receiving water from said water source;

said tank is disposed in serial fluid communication between said inlet conduit and said outlet conduit such that water flows from upstream to downstream from said inlet conduit into said tank and then from said tank to said outlet conduit;

said tank isolates said outlet conduit from said inlet conduit such that liquid pressure in said outlet conduit supplying said pre-mixed footbath liquid to said pan is isolated from water pressure in said inlet conduit supplying water from said water source;

said pan further comprises a door having a closed position retaining said pre-mixed footbath liquid in said pan, and having an open position draining said pre-mixed footbath liquid from said pan;

said inlet through said manifold supplies said pre-mixed footbath liquid to flow into and along said pan;

wherein said manifold has one or more flow ports along a given lateral span and discharging liquid at sufficiently high volume and sufficiently low velocity flow to provide non-turbulence, to flush manure without turbulent agitation and eddy current flow otherwise causing splatter and release of bacteria and odor upon break-up of the manure;

wherein said one or more flow ports comprise one or more laterally elongated slots laterally spaced from each other.

23. The footbath system according to claim 22 further comprising a valve having an on state permitting liquid flow from said tank through said outlet conduit to said pan, and having an off state blocking said liquid flow from said tank through said outlet conduit to said pan.

24. The footbath system according to claim 22 further comprising a pump pumping liquid from said tank through said outlet conduit to said pan at a pressure independent of water pressure from said water source.

25. The footbath system according to claim 22 further comprising a pump in said outlet conduit pumping liquid from said tank through said outlet conduit to said pan, and a valve in said outlet conduit downstream of said pump and having an on state permitting liquid flow through said outlet conduit to said pan and having an off state blocking liquid flow through said outlet conduit to said pan.

26. The footbath system according to claim 22 wherein said tank has a chemical inlet conduit, and wherein said chemical source comprises a chemical container storing one or more chemicals, said chemical container supplying said one or more chemicals along said chemical inlet conduit to said tank.

27. The footbath system according to claim 26 wherein said chemical container is a hopper storing one or more powder chemicals, and wherein said chemical inlet conduit transports said powdered chemicals to said tank.

28. The footbath system according to claim 22 wherein said tank has a first inlet conduit receiving water from said water source, a second inlet conduit receiving one or more chemicals from said chemical source, and an outlet conduit supplying said pre-mixed footbath liquid to said pan.

29. The footbath system according to claim 22 wherein said door is at said downstream end wall, and wherein said door has an edge pivoted on a hinge about a pivot axis, and an opposite edge swingable in an arc about said pivot axis between said closed position and said open position.

30. The footbath system according to claim 29 wherein said edge is an upper edge, and said door is pivoted about said upper edge on said hinge about an upper pivot axis, and wherein said opposite edge is a lower edge swingable in an arc about said upper pivot axis between said closed position and said open position.

31. The footbath system according to claim 22 wherein said door is at said downstream end wall and extends along substantially the entire length of said downstream end wall.

32. The footbath system according to claim 22 wherein said door is at said downstream end wall, and the lateral length of said door is less than the lateral length of said downstream end wall, and comprising tapered ramp surfaces between respective said sidewalls and said downstream end wall and guiding flow therealong.

33. The footbath system according to claim 22 wherein said manifold has one or more flow ports along a given span, and said door is distally opposite said flow ports and has a length at least as great as said span.

34. The footbath system according to claim 22 wherein said non-turbulent flow is along a rectilinear flow path from said manifold to said door without eddy currents.

35. The footbath system according to claim 22 wherein said manifold supplies said pre-mixed footbath liquid in laminar flow into and along said pan.

36. The footbath system according to claim 22 wherein said manifold supplies said pre-mixed footbath liquid in transitional flow into and along said pan.

37. The footbath system according to claim 22 wherein said manifold supplies said pre-mixed footbath liquid to flow into and along said pan in each of said closed and open positions of said door.

38. The footbath system according to claim 22 wherein said outlet conduit comprises an upstream segment receiving said pre-mixed footbath liquid from said tank, and a plurality of parallel downstream segments receiving said pre-mixed footbath liquid in parallel from said upstream segment and supplying said pre-mixed footbath liquid to a plurality of respective said pans, a plurality of valves each in a respective one of said downstream segments and having an on state permitting liquid flow from said tank through said upstream segment then through the respective said downstream segment to the respective said pan, and having an off state blocking said liquid flow.

39. The footbath system according to claim 38 wherein said tank comprises said combined water containing and chemical mixing tank separate from said pans, said tank having a second inlet conduit receiving one or more chemicals from one or more chemical sources for mixing in said tank to provide said pre-mixed footbath liquid, said outlet conduit supplying said pre-mixed footbath liquid to said pans.

40. A method for treating hooves of livestock, comprising;
providing the structure of the footbath system for livestock of claim 1,
providing said pan with a door having a closed position retaining said footbath liquid in said pan, and having an open position draining said footbath liquid from said pan;
supplying said footbath liquid from said inlet in non-turbulent flow into and along said pan;
providing said system with a drain mode, a flush mode, and a fill mode;
in said drain mode, opening said door without liquid flow into said pan;
in said flush mode, opening said door and supplying said footbath liquid in non-turbulent flow into and along said pan;
in said fill mode, closing said door and supplying said footbath liquid in non-turbulent flow into and along said pan;
wherein livestock manure is flushed and drained from said pan without the use of turbulent flow.

41. The method according to claim 40 comprising, during said fill mode, additionally supplying one or more chemicals into said pan through the same said inlet supplying said footbath liquid in said non-turbulent flow.

42. The method according to claim 40 comprising providing said door with an edge pivoted on a hinge about a pivot axis, and an opposite edge swingable in an arc about said pivot axis, and swinging said opposite edge of said door about said arc about said pivot axis between said closed position and said open position.

43. The method according to claim 42 comprising providing said edge as an upper edge, and pivoting said door about said upper edge on said hinge about an upper pivot axis, and providing said opposite edge as a lower edge, and swinging said lower edge in an arc about said upper pivot axis between said closed position and said open position.

44. The method according to claim 40 comprising providing said pan with an upstream end wall and a downstream end wall, providing said door at said downstream end wall and extending said door along substantially the entire length of said downstream end wall.

45. The method according to claim 40 comprising providing said pan with upstream and downstream end walls and a pair of sidewalls extending axially therebetween, providing said door at said downstream end wall, providing said door of a lateral length less than the lateral length of said downstream end wall, providing tapered ramp surfaces between respective said sidewalls and said downstream end wall and guiding flow therealong.

46. The method according to claim 40 comprising providing said inlet of said pan with a manifold having one or more flow ports along a given span, and providing said door distally opposite said flow ports of said manifold and of a length at least as great as said span.

47. The method according to claim 40 comprising supplying said footbath liquid in non-turbulent flow into and along said pan along a rectilinear flow path through said pan.

48. The method according to claim 47 comprising supplying said inlet of said pan with a manifold having one or more flow ports, and providing said non-turbulent flow along a rectilinear flow path from said flow ports to said door without eddy currents.

* * * * *